(12) United States Patent
Biernatowski

(10) Patent No.: US 9,964,279 B2
(45) Date of Patent: May 8, 2018

(54) LED LIGHTING SYSTEM FOR VEHICLE

(71) Applicant: HELLA ROMANIA S.R.L., Ghiroda, TM (RO)

(72) Inventor: Artur Biernatowski, Lippstadt (DE)

(73) Assignee: Hella KGaA Hueck & Co., Lippstadt (DE)

( * ) Notice: Subject to any disclaimer, the term of this patent is extended or adjusted under 35 U.S.C. 154(b) by 206 days.

(21) Appl. No.: 14/904,646

(22) PCT Filed: Jul. 14, 2014

(86) PCT No.: PCT/RO2014/000020
§ 371 (c)(1),
(2) Date: Jan. 12, 2016

(87) PCT Pub. No.: WO2015/023202
PCT Pub. Date: Feb. 19, 2015

(65) Prior Publication Data
US 2016/0169470 A1    Jun. 16, 2016

(30) Foreign Application Priority Data

Jul. 16, 2013 (RO) .................................. 13-00535

(51) Int. Cl.
*F21V 17/12* (2006.01)
*B60Q 1/26* (2006.01)
(Continued)

(52) U.S. Cl.
CPC ............ *F21S 48/31* (2013.01); *B60Q 1/2607* (2013.01); *B60Q 1/2623* (2013.01);
(Continued)

(58) Field of Classification Search
CPC .......... F21W 2101/02; F21W 2101/12; F21W 2101/14; F21S 48/115; F21S 48/1154;
(Continued)

(56) References Cited

U.S. PATENT DOCUMENTS 5,101,326 A * 3/1992 Roney .................. B60Q 1/2615
362/249.01
6,149,288 A * 11/2000 Huang ................. B60Q 1/2615
362/459

(Continued)

FOREIGN PATENT DOCUMENTS

DE       44 21 306       1/1995
DE       203 04 930      8/2003
(Continued)

*Primary Examiner* — Ismael Negron
(74) *Attorney, Agent, or Firm* — Husch Blackwell LLP

(57) ABSTRACT

A system includes a housing, at least two lighting units, a lens, at least two fastening elements, and a protective optical element which covers the fastening elements of the lighting system. The lens and the housing are provided with at least two corresponding openings provided in a central area and configured to allow the positioning of the fastening elements. The lens has a frontal surface, comprising a central recessed area. Tubular elements oriented inwards to the lighting system extend and fit into the corresponding holes, when assembling the lens and the housing.

12 Claims, 7 Drawing Sheets

(51) Int. Cl.
  *F21S 8/10*   (2006.01)
  *B60Q 1/34*   (2006.01)
  *B60Q 1/44*   (2006.01)
  *B60Q 1/30*   (2006.01)

(52) U.S. Cl.
  CPC .............. *B60Q 1/2626* (2013.01); *B60Q 1/30* (2013.01); *B60Q 1/34* (2013.01); *B60Q 1/44* (2013.01); *F21S 48/215* (2013.01); *F21S 48/234* (2013.01); *F21S 48/33* (2013.01)

(58) Field of Classification Search
  CPC .... F21S 48/1208; F21S 48/20; F21S 48/2206; F21S 43/27; F21V 17/06; F21V 17/12; B60Q 1/2626
  See application file for complete search history.

(56) References Cited

U.S. PATENT DOCUMENTS

| | | | | |
|---|---|---|---|---|
| 6,276,822 B1* | 8/2001 | Bedrosian | ............ | F21S 48/1154 362/545 |
| 6,431,728 B1* | 8/2002 | Fredericks | ........... | B60Q 1/2696 340/901 |
| 6,612,728 B2* | 9/2003 | Roller | ...................... | B60Q 1/32 362/327 |
| 6,739,733 B1* | 5/2004 | Lamke | ................ | B60Q 1/2696 257/E25.028 |
| 7,038,593 B2* | 5/2006 | Pederson | ............. | B60Q 1/2611 340/425.5 |
| 7,118,261 B2* | 10/2006 | Fredericks | ............. | B64D 47/06 362/249.14 |
| 7,273,306 B2* | 9/2007 | Sassoon | ................... | B60Q 1/32 362/522 |
| 7,497,606 B1* | 3/2009 | Tsai | ..................... | B60Q 1/2607 362/516 |
| 2002/0067548 A1* | 6/2002 | TerHovhannisian | ..... | B60Q 1/32 359/627 |
| 2005/0128761 A1* | 6/2005 | Wu | .......................... | B60Q 1/32 362/498 |
| 2015/0184809 A1* | 7/2015 | Kuo | .......................... | F21V 5/04 362/311.14 |

FOREIGN PATENT DOCUMENTS

| | | |
|---|---|---|
| EP | 0 150 637 | 8/1985 |
| FR | 2 347 611 | 11/1977 |
| WO | 2010/151209 | 12/2010 |

* cited by examiner

LED LIGHTING SYSTEM FOR VEHICLE

CROSS REFERENCE

This application claims priority to PCT Patent Application No. PCT/RO2014/000020, filed Jul. 14, 2014, which itself claims priority to Romanian Application No. a-2013-00535, filed Jul. 16, 2013, the entirety of both of which are hereby incorporated by reference.

FIELD OF THE INVENTION

The invention relates to a compact lighting system with LEDs for use in the automotive industry and, in particular, for signaling the rear of agricultural machinery.

BACKGROUND OF THE INVENTION

In automotive industry several lighting systems are known that are mounted on the vehicle's body through different kinds of fasteners, such as screws, pins, bolts or clamps, positioned at the side of the lighting system's surface.

The European patent EP 2168748 shows a known lighting system comprising a watertight lamp having a housing with a lens sealed on it, the lens being configured at its ends with two cavities for the arrangement of the lamp's fastening elements.

In order to protect the fastening elements of the lighting systems against external elements, such as the environmental factors, or against hang-ups with the objects they touch, it is necessary for the fastening elements to be covered with various caps and protective devices. This is especially true in the agricultural field, where lighting systems often come in contact with plants that can snag and damage the lighting system.

Known lighting systems either do not include covers and protection devices, or they are manufactured by complicated, time-consuming and, above all, material-consuming processes. Moreover, the covers and protective devices, even when present, either reduce the efficiency of the light dispersion surface and therefore lessen the efficiency of the vehicle's lighting system, or excessively increase the overall dimensions of the lighting system.

SUMMARY OF THE INVENTION

The object of the present invention is to provide a lighting system that is compact, efficient, relatively thin, which includes a protection device for the fastening elements of the lighting systems that are easily manufactured with a minimum consumption of material, are easy to install, and which does not reduce the lighting system's active surface and which ensures efficiently the dispersion and reflection of the light transmitted by the lighting system or received from any external light source.

The technical problem solved by the invention is to improve the lighting efficiency of the lamps for motor vehicles, to reduce the overall dimensions of lighting systems by using LED circuit boards and to protect the fastening elements of the lighting system on the vehicle without reducing the light dispersion surface, ensuring efficient dispersion and reflection of the light, with a minimum consumption of material.

Compact lighting system according to the invention comprises a lens and a housing provided with at least two corresponding holes, and suitable configurations to allow the central positioning of the fastening elements, and also a protective optical element which covers the fastening elements of the lighting system.

A compact lighting system according to invention offers the following advantages:
  it is an economic system which does not require supplementary material consumption;
  it is thin due to the use of printed circuit boards with LEDs;
  an increased the light rejecting surface by using a retro-reflective element as a protective optical element efficiently reflecting the light received from any external source;
  it protects the fastening elements of the lighting system against environmental factors, while providing an improved appearance as the fastening elements are being hidden; and
  it provides a flexible solution for mounting of the lighting system.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
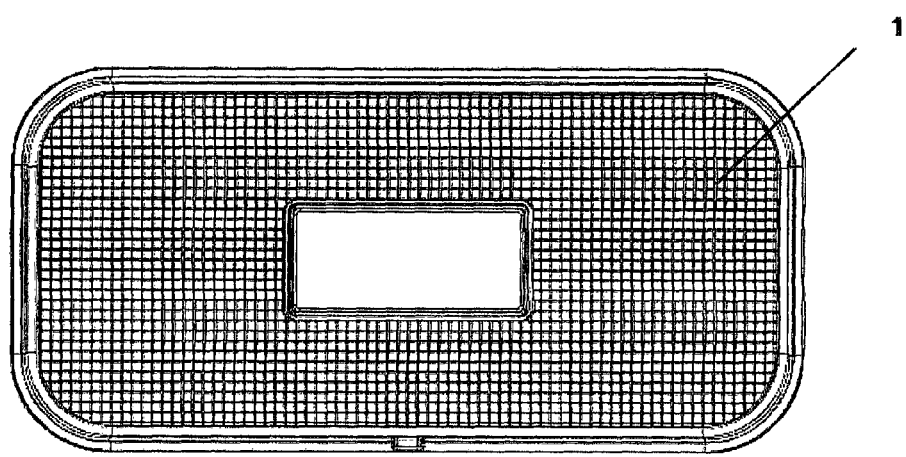
FIG. 1—Front view of compact lighting system according to the invention.
Figure 2A:
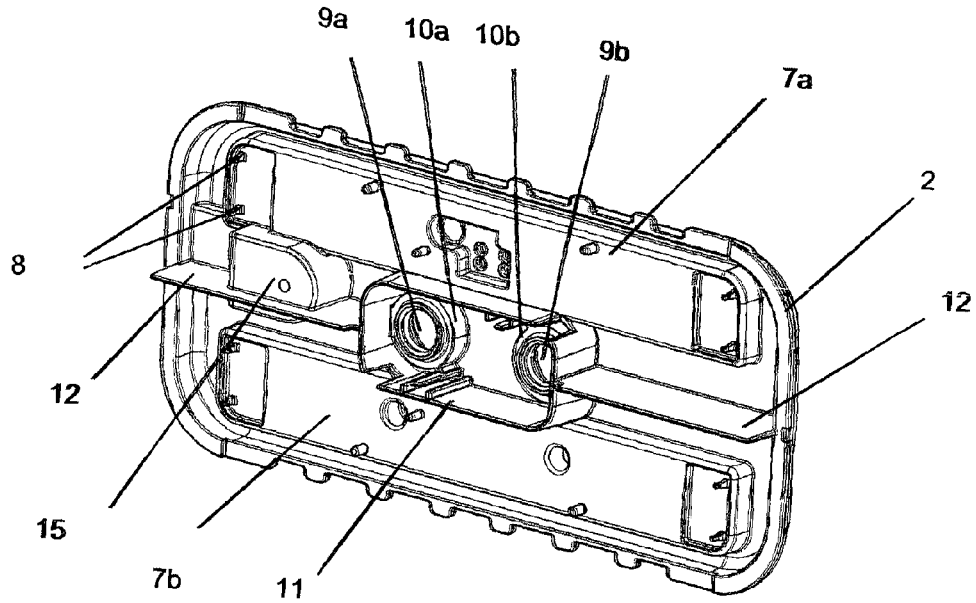
FIG. 2a—Front view of compact lighting system's housing.
Figure 3A:
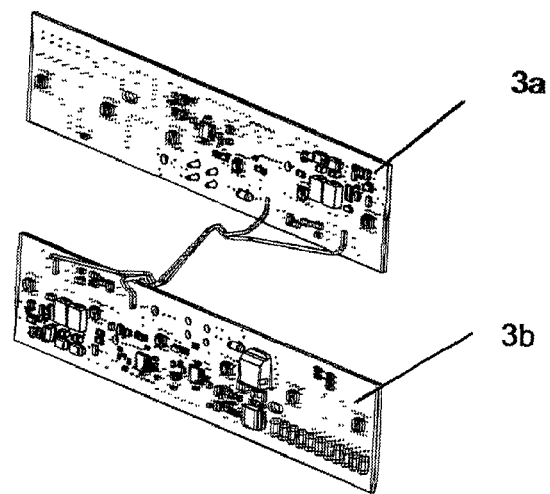
FIG. 3a—Front view of electrical lighting components.
Figure 3B:
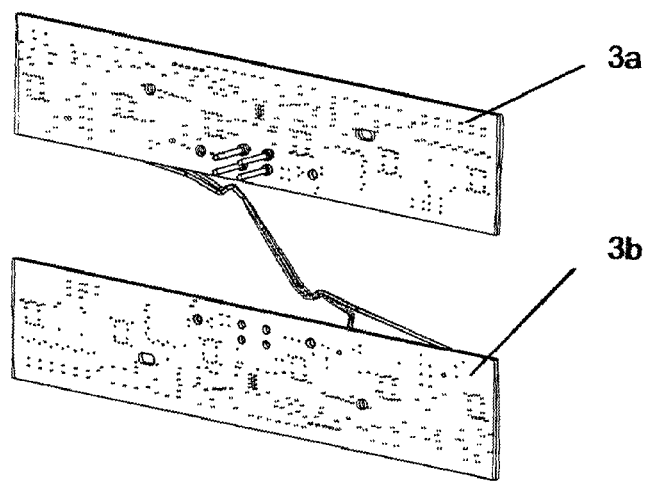
FIG. 3b—Back view of electrical lighting components.
Figure 4A:
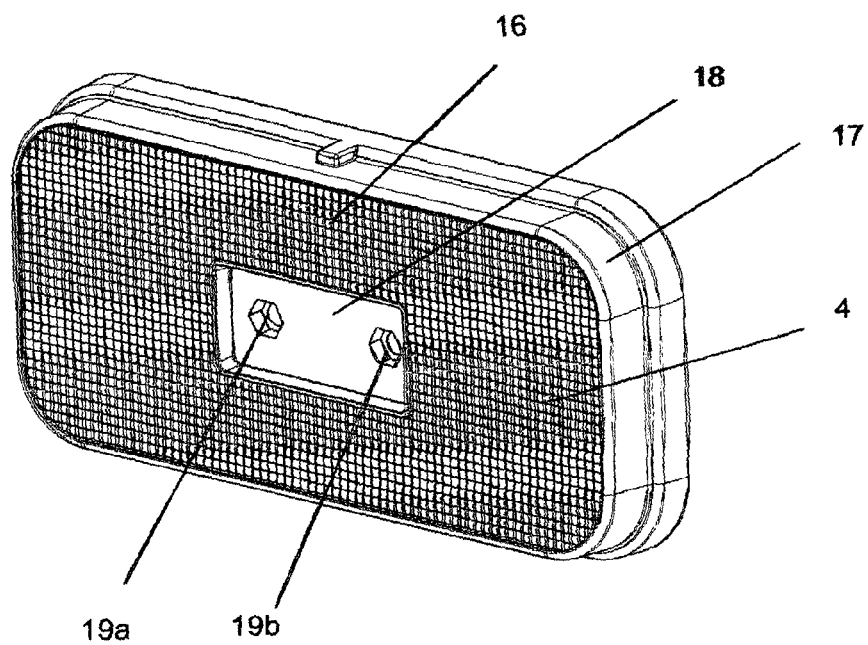
FIG. 4a—Front view of lighting system's lens.
Figure 4B:
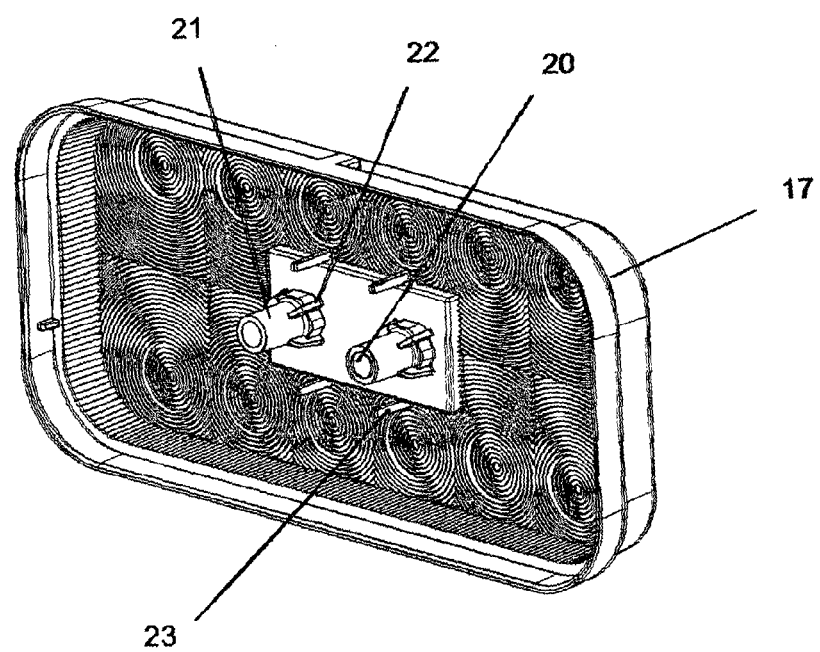
FIG. 4b—Back view of lighting system's lens.
Figure 5:
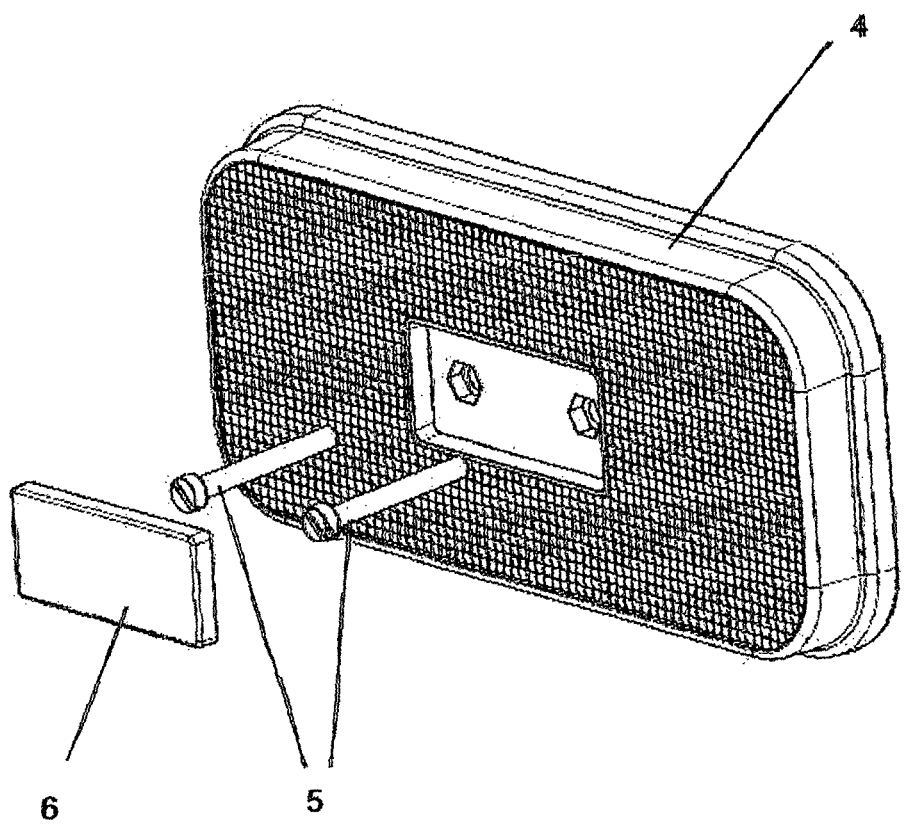
FIG. 5—Partially exploded perspective view of the lighting system, distinguishing the fastening elements and the protective optical element.

A compact lighting system according to the invention as shown assembled in FIG. 1 comprises a housing 2 (FIGS. 2a and 2b) and electrical lighting components: an electronic board 3a for lighting upon brake actuation, and an electronic board 3b for lighting a turn signal (FIG. 3), a lens 4 (FIGS. 4a and 4b), fastening elements 5 of the lighting system on the vehicle body (FIG. 5) and a protective optical element 6 (FIG. 5) which protects the fastening elements.

Housing 2 has a rectangular shape as shown, but can take any form in accordance with the regulations in force on the market of the vehicle which is mounted on. Housing 2 may be made of plastic—preferably ABS—and is designed on the inside with two cavities 7a and 7b placed symmetrically to the longitudinal axis of the housing, for the arrangement of the electric lighting components 3a and 3b, respectively, in the shown embodiment, so that the upper side of the housings hosts the printed circuit board 3a for lighting upon brake actuation, and the bottom of the housing hosts the printed circuit board 3b for lighting a turn signal. The printed circuit boards 3a and 3b are fastened by hooks 8 and, with an adhesive material, they stick to the housing to ensure their mounting white the lighting system is operating.

On the central zone of the longitudinal axis of the housing, there are two holes 9a and 9b located symmetrically with respect to the transverse axis of the housing, which are designed to allow the passage of fastening elements 5. To be noted that the number and position of the holes, in the embodiment shown, are provided for illustration only and they are not limited to this example, but depending on the construction of the vehicle. To reinforce said holes, they are bounded, each one around, by a raised area from the body of the housing, in the shape of some bushings 10a and 10b.

Figure 2B:
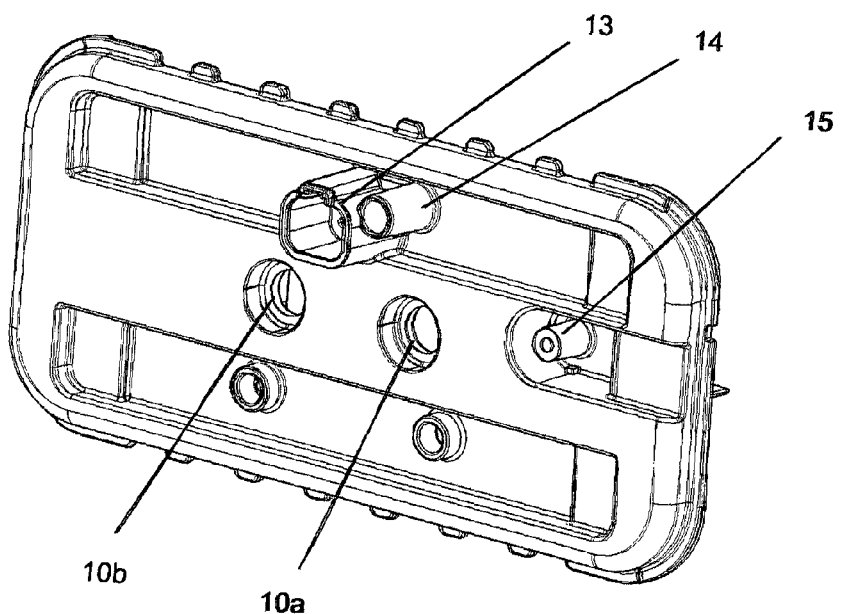
FIG. 2b—Back view of compact lighting system's housing.

A continuous reinforcing rib 11, defining in the embodiment shown a substantially rectangular shape with rounded corners, is provided to surround both surfaces of the protections around the hole. On each side of the reinforcing rib, on its longitudinal axis, there are two ribs 12 which separate the light flows coming from, respectively, LED printed circuit boards 3a and 3b. Reinforcing rib 11 and the two separating ribs 12 create two closed spaces, one space at the upper side of the housing, corresponding to luminous flow emitted by the electronic board with the role of signaling the brake actuation, and another space at the bottom of the housing corresponding to luminous flow emitted by the electronic board with the role of signaling a turn signal. The ribs have the same height and do not allow light flow emitted by printed circuit boards 3a and 3b to pass from one closed space to another. The housing 2 is provided at the top with four pins 24 designed to connect the electronic lighting boards, through a connector, to power and control cables from the vehicle's electric system. FIG. 2b shows a connecting cable 13 and a tube 14 for inserting an adhesive inside the said connector, in order to seal it. The housing 2 also includes a ventilation element 15 to avoid the overheating of the electronic lighting boards. The housing has a recess around its perimeter which forms a channel for the adhesive when mounting the lens.

Figure 6:
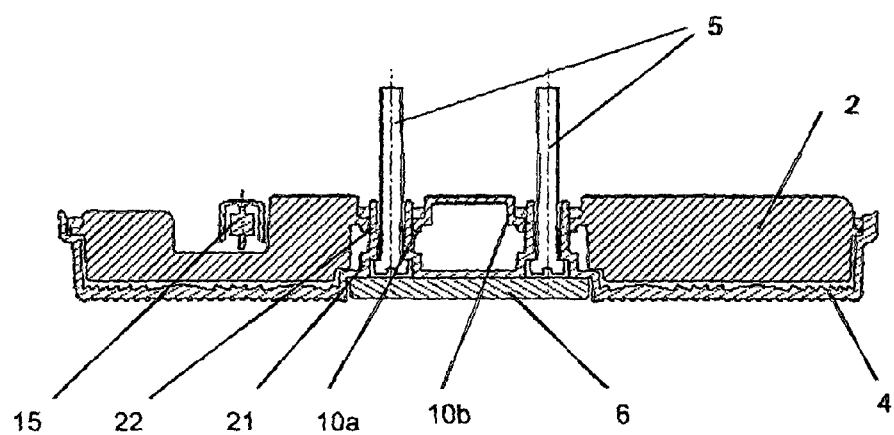
FIG. 6—Sectional view of the lighting system through the longitudinal axis of the compact lighting system.
Figure 7:
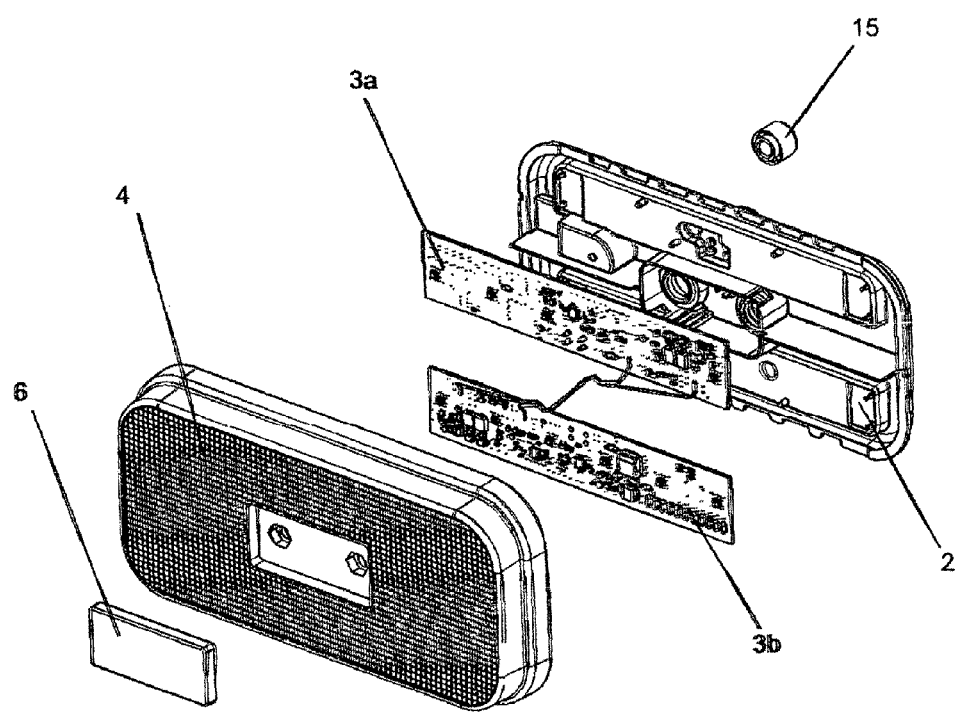
FIG. 7—Exploded perspective view of the lighting system according to the invention.

The lighting system includes a lens 4 which is rectangular shaped as a cover, but can have any form needed to comply with the regulations in force on the market of the vehicle on which is mounted. The lens may be made of a transparent material which has a frontal optic surface 16, and a side surface 17 covering the housing with which the lens is being complementary sized, in order to ensure a tight assembly between the housing and the lens, which both are being provided with corresponding connecting elements to achieve a fixed mounting, such as bonding joint or click or any other similar means. Lens 4 has a central rectangular recess 18, which can be shaped in any form needed to comply with the regulations in force on the market of the vehicle which is mounted on. On the longitudinal axis of the lighting system, and respectively, on the central area of recess 18, there are two openings 19a and 19b. whose axis corresponds respectively to the axis of the holes 9a and 9b on the housing 2, when the lens 4 is assembled with the housing 2 in order to allow the fastening elements 5 to pass through the lens and the housing and to be attached on the vehicle's body. Each of the openings 19a and 19b extend into the interior of the lighting system with a tubular element 20, whose inner surface has a pattern shape corresponding to a fastening element 5, and it also presents a part 21 having a larger diameter, into which is being fitted to accommodate the head of a fastening element which continues with a smaller diameter 22, corresponding to the fastening elements size. As can be seen in FIG. 6, the tubular elements 20 extend up to the housing 2 and through the housing, when the lens 4 and the housing 2 are connected, entering into the holes 9a and 9b provided in the said housing 2. The outer diameter of the tubular part 22 is slightly smaller than the diameter of the holes 9a and 9b provided in the housing, so that the tubular elements 20 will fit firmly in the holes 9a and 9b provided in the housing, when mounting the lens 4 on the housing 2 to form a compact rigid assembly. Also inwards the system, lens 4 is provided with four spacing feet 23 to ensure a minimal necessary distance between the inner surface of the lens 4 and printed circuit boards 3a and 3b, and a rib with the purpose of preventing any erroneous mounting between housing 2 and lens 4. When installing the lighting system, fastening elements 5 are inserted into the holes of the lens 4 and after passing through the tubular elements 20, they are attached on the vehicle body. Due the interior shape of the tubular elements 20, which is complementary with the fastening elements 5, those fit entirety within the tubular elements 20 so that the top of the head of the fastening element 5 is located flush with the front surface of the recessed area 18 of the lens 4. Said tubular elements 20 are designed to support and guide said fastening elements 5 and also to ensure a supplementary reinforcement of the lighting system.

The lighting system also comprises a protective optical element 6 assembled by gluing, with a double-sided adhesive tape in the recess 18 of the lens, after the mounting of the light system 1 on the vehicle body by means of fastening elements 5, so the protective optical element covers fastening elements 5. The protective optical element 6 has a configuration complementary to those of recessed area 18 from the front surface of the lens, so that the front surface of the protective optical element 6 assembled by bonding on the recess 18 is flush with the front surface 16 of the lens and covers entirety the recessed area 18, therefore masking the fastening elements 5. Optical element 6 protects the fastening elements against external factors and, at the same time, against their potential bang-ups by any object that might come in contact with them. It is preferable that the optical element is made of a material having the same optical characteristics as the lens. Most preferably, the optical element is a retro-reflector. This way, when the lighting system mounted on a vehicle is illuminated by an external tight source, like the lamps of another approaching vehicle, the optical element reflects the incident light, showing the presence on the road of the vehicle which it is mounted on.

Although the above has described in detail an embodiment of the invention, it has been presented solely as an example, and for those stalled in the art it win be obvious that the invention is not limited thereto, but is intended to cover modifications within the scope of the invention, as defined in the appended claims.

The invention claimed is:

1. A lighting system for a vehicle, the system comprising:
a housing including at least two holes in a central area;
at least two lighting units received in the housing, each unit including at least one light emitting diode mounted on printed circuit board, said lighting units electrically interconnected with each other and configured to be connected with an electrical system of the vehicle;
a lens including at least two orifices in a central area;
at least two fastening elements; and
a protective optical element;
wherein the orifices of said lens correspond to the holes of said housing, such that the fastening elements pass through both the orifices and holes to couple said lens to said housing to cover the lighting units, said protective optical element coupled to said lens to cover said fastening elements, and
wherein each orifice formed in a tubular element projecting from the lens, and the housing has raised areas protruding around said holes into which said tubular elements are fitted, for reinforcing each of said holes.

2. The compact lighting system according to claim 1, wherein the housing is provided with a continuous reinforcing rib around said holes, and two separation ribs located on the longitudinal axis of the lighting system on both sides of said reinforcing rib, wherein the reinforcing rib cooperates with said separation ribs to divide an interior of the system into two closed spaces, symmetrical about the longitudinal axis of the compact lighting system,
wherein one of said lighting units is positioned in each of the closed spaces, with
said ribs configured to prevent light from each lighting unit from passing from one closed space to another.

3. The compact lighting system according to claim 1, wherein said lens, said housing, said front surface of the lens, said recessed portion of said lens, and said optical element are rectangular shaped.

4. The compact lighting system according to claim 1, wherein said protective optical element is a retro-reflector.

5. The compact lighting system according to claim 1, wherein the protective optical element is made of the same material as said lens and has the same optical properties as said lens.

6. The compact lighting system according to claim 1, further comprising:
a recessed portion formed on the front surface of the lens in the central area, said at least two orifices formed in the recessed portion,
one or more tubular elements formed on a back surface of the lens and extending towards the lighting system, said tubular elements configured to fit into the holes when said lens and housing are assembled,
wherein said tubular elements have an inner surface shaped to correspond to that of said fastening elements so that the fastening elements fit within the tubular elements without extending beyond the front surface of said recessed portion of said lens.

7. The compact lighting system according to claim 6, wherein the protective optical element is shaped and dimensioned to fit said recessed portion of said lens, so that said optical element covers entirely the recessed portion when mounted on the top of the recessed portion.

8. The compact lighting system according to claim 7 wherein the protective optical element is bonded to the recessed portion of said lens, over said fastening elements, and such that the front surface of said optical element is flush with the front surface of said lens.

9. A lighting system for a vehicle, the system comprising:
a housing including at least two holes in a central area;
at least two lighting units received in the housing, each unit including at least one light emitting diode mounted on printed circuit board,
said lighting units electrically interconnected with each other and
configured to be connected with an electrical system of the vehicle;
a lens including at least two orifices in a central area;
at least two fastening elements; and
a protective optical element;
wherein the orifices of said lens correspond to the holes of said housing, such that the fastening elements pass through both the orifices and holes to couple said lens to said housing to cover the lighting units, said protective optical element coupled to said lens to cover said fastening elements,
wherein the housing is provided with a continuous reinforcing rib around said holes, and two separation ribs located on the longitudinal axis of the lighting system on both sides of said reinforcing rib, wherein the reinforcing rib cooperates with said separation ribs to divide an interior of the system into two closed spaces, symmetrical about the longitudinal axis of the compact lighting system,
wherein one of said lighting units is positioned in each of the closed spaces, with said ribs configured to prevent light from each lighting unit from passing from one closed space to another.

10. A lighting system for a vehicle, the system comprising:
a housing including at least two holes in a central area;
at least two lighting units received in the housing, each unit including at least one light emitting diode mounted on printed circuit board, said lighting units electrically interconnected with each other and configured to be connected with an electrical system of the vehicle;
a lens including at least two orifices in a central recessed portion of a front surface of the lens;
at least two fastening elements; and
a protective optical element;
wherein the orifices of said lens correspond to the holes of said housing, such that the fastening elements pass through both the orifices and holes to couple said lens to said housing to cover the lighting units, said protective optical element coupled to said lens to cover said fastening elements,
wherein said lens, said housing, said front surface of the lens, said recessed-portion of said lens, and said protective optical element are rectangular shaped.

11. A lighting system for a vehicle, the system comprising:
a housing including at least two holes in a central area;
at least two lighting units received in the housing, each unit including at least one light emitting diode mounted on printed circuit board, said lighting units electrically interconnected with each other and configured to be connected with an electrical system of the vehicle;
a lens including at least two orifices in a central area;
at least two fastening elements; and
a protective optical element;
wherein the orifices of said lens correspond to the holes of said housing, such that the fastening elements pass through both the orifices and holes to couple said lens to said housing to cover the lighting units, said protective optical element coupled to said lens to cover said fastening elements, and
wherein said protective optical element is a retro-reflector.

12. A lighting system for a vehicle, the system comprising:
a housing including at least two holes in a central area;
at least two lighting units received in the housing, each unit including at least one light emitting diode mounted on printed circuit board, said lighting units electrically interconnected with each other and configured to be connected with an electrical system of the vehicle;
a lens including at least two orifices in a central area;
at least two fastening elements; and
a protective optical element;
a recessed portion formed on the front surface of the lens in the central area, said at least two orifices formed in the recessed portion;
one or more tubular elements formed on a back surface of the lens and extending towards the lighting system, said tubular elements configured to fit into the holes when said lens and housing are assembled;

wherein the orifices of said lens correspond to the holes of said housing, such that the fastening elements pass through both the orifices and holes to couple said lens to said housing to cover the lighting units, said protective optical element coupled to said lens to cover said fastening elements, wherein said tubular elements have an inner surface shaped to correspond to that of said fastening elements so that the fastening elements fit within the tubular elements without extending beyond the front surface of said recessed portion of said lens, wherein the protective optical element is shaped and dimensioned to fit said recessed portion of said lens, so that said protective optical element covers entirely the recessed portion when mounted on the top of the recessed portion, and wherein the protective optical element is bonded to the recessed portion of said lens, over said fastening elements, and such that the front surface of said protective optical element is flush with the front surface of said lens.

\* \* \* \* \*